No. 729,129.

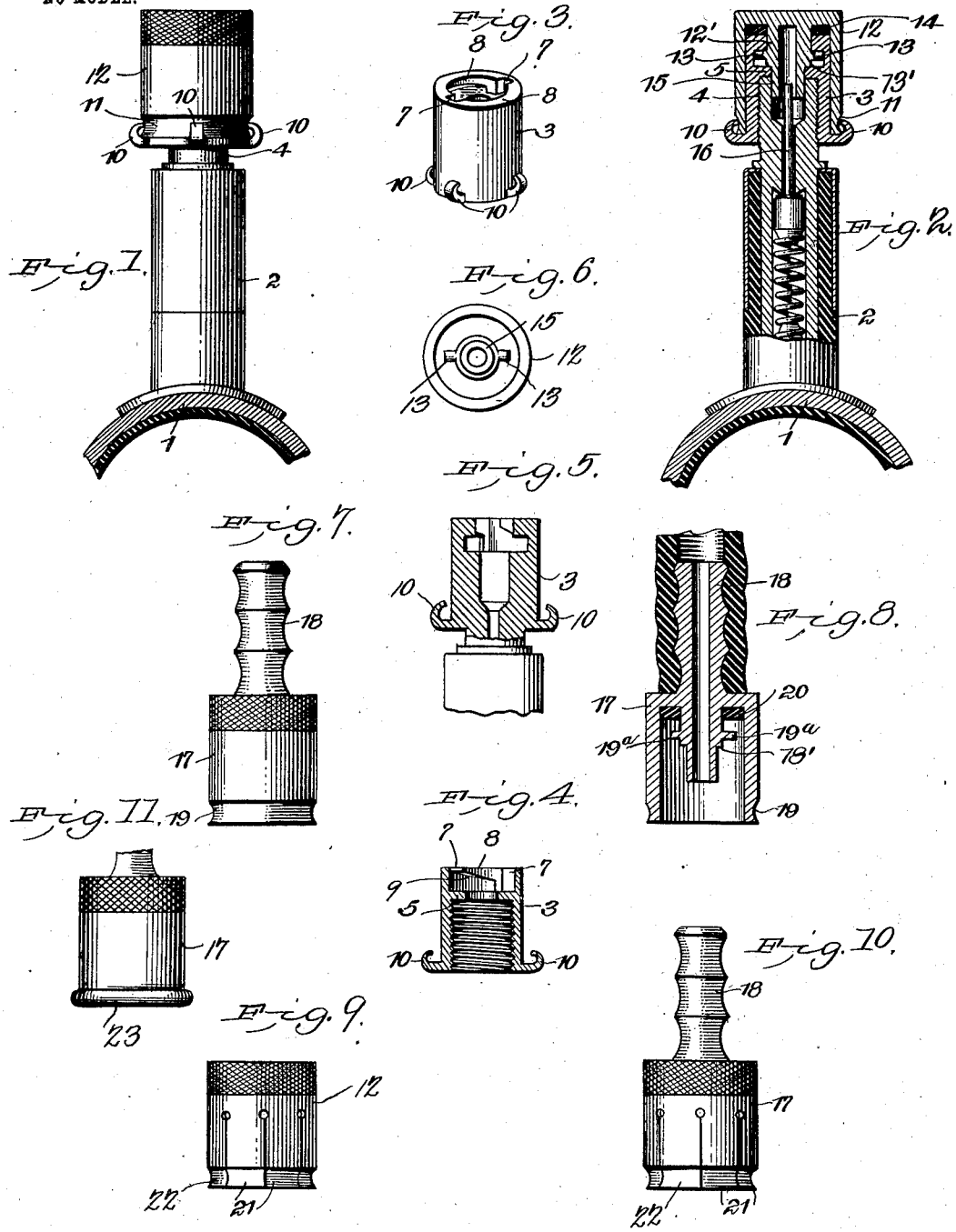

Patented May 26, 1903.

UNITED STATES PATENT OFFICE.

ALBERT BAXTER CATTERALL, OF DAVENPORT, IOWA.

VALVE-COUPLING FOR PNEUMATIC TIRES.

SPECIFICATION forming part of Letters Patent No. 729,129, dated May 26, 1903.

Application filed February 27, 1903. Serial No. 145,414. (No model.)

*To all whom it may concern:*

Be it known that I, ALBERT BAXTER CATTERALL, a citizen of the United States, residing at Davenport, in the county of Scott and State of Iowa, have invented a new and useful Valve-Coupling for Pneumatic Tires, of which the following is a specification.

This invention relates to certain improvements in air-valves adapted for use on bicycles, automobiles, and other vehicle-tires.

The object of the invention is to provide a simple, inexpensive, and efficient device of this character which may be quickly applied to and locked in position on the valve-casing, the relative disposition of the several parts being such as to permit the cap being quickly detached when desired and the pump-tube coupled with the valve for inflating the tire.

A further object of the invention is to provide a valve in which the usual threaded cap or cover is dispensed with, the end of the valve-casing and the cap, as well as the air-tube connection from the pump, being provided with interlocking parts which when secured together form an air-tight coupling effectually preventing the escape of air.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the spirit or sacrificing any of the advantages of this invention.

In the drawings, Figure 1 is a side elevation of a valve-casing and cap constructed in accordance with my invention. Fig. 2 is a transverse sectional view of the same. Fig. 3 is a detail perspective view of the collar or sleeve detached. Fig. 4 is a vertical sectional view of the same. Fig. 5 is a side elevation, partly in section, showing a modified form of collar or sleeve in which the collar is formed integral with the valve-casing. Fig. 6 is a bottom plan view of the cap or cover. Fig. 7 is a side elevation of the pump-coupling. Fig. 8 is a vertical sectional view thereof, showing a section of pump-tube attached thereto. Figs. 9 and 10 are modified forms of the cap or cover and hose-coupling, and Fig. 11 is a further modification of the cap or cover.

Similar numerals of reference indicate corresponding parts in all the figures of the drawings.

1 designates a section of a vehicle-tire, and 2 the valve-casing, which may be of the usual form and construction, being secured to the tire in the ordinary manner. An interiorly-threaded sleeve or collar 3 engages the threaded end 4 of the valve-casing, and this sleeve or collar is provided with an inwardly-extending annular flange 5, which rests upon the end portion of the valve-casing when said collar is screwed to its seat. The upper end of the sleeve or collar is also provided with an inwardly-extending flange having coincident and preferably rectangular openings 7 formed therein, defining a pair of inwardly-extending segmental plates 8, the under sides of which are inclined or beveled in opposite directions, as shown at 9. The lower end of the sleeve or collar is provided with a series of radially-projecting upturned spring arms or fingers 10, adapted to engage an annular groove or channel 11, formed in the lower portion of a cap or cover 12, and by means of which the cap is secured in position on the valve. The cap 12 is provided with a central depending tube 12', having oppositely-disposed ears or lugs 13, which fit within the opening 7 when the cap is placed in position, and the cap may be securely locked to the valve-casing by giving the same a half-turn to the right, which causes the ears 13 to engage the lower inclined faces of the plates 8, firmly clamping the parts together. A packing ring or washer 14, formed of rubber or other suitable material, is interposed between the tube 12' and the interior walls of the cap and preferably at the top thereof, said washer resting against the top portion of the sleeve or collar, as shown. The depending tube 12' is formed with an annular shoulder 13', which rests on the flange 5 when the cap is in position, preventing the escape of air, and said tube is also provided with a hollow extension 15, adapted to receive the stem 16 of the valve, as clearly shown in Fig. 2 of the drawings.

In Figs. 7 and 8 I have shown a section of a pump-tube having a novel form of coupling secured thereto and adapted to be used in conjunction with the valve for inflating the tire. The coupling consists of a cup-shaped casing 17 of substantially the same construction as the cap 12 and adapted to be interchanged therewith when the tire is inflated, the lower end of the casing 17 being provided with an annular groove 19, which engages the spring-arms 10 on the valve when the pump is coupled. The coupling is provided with a hollow threaded tube or extension 18, which screws within the pump-hose, and the lower end of said tube passes through the top of the casing 17 and is provided with outwardly-extending lugs 19ª, adapted to enter the openings 7 in the collar 3 and engage the inclined portion of the plates 8, securely locking the pump to the valve. The lower end of the extension 18 is also provided with a washer 20 and an annular collar 18', adapted to bear against the inwardly-extending flange 5 of the sleeve or collar 3 and prevent the escape of air while inflating the tire.

In assembling the several parts comprising the valve the sleeve or collar is first screwed on the threaded extension of the valve, after which the cap or cover is placed over the collar and forced downwardly until the lugs 13 register with the openings 7 in the segmental plates and the spring-fingers 10 engage the annular groove in the cap. The cap is then given a half-turn to the right, which causes the lugs 13 to engage the inclined faces of the plates 8, securely locking the parts together. When it is desired to inflate the tire, the cap may be removed by turning the same to the left and pulling upwardly thereon, causing the spring-fingers to become disengaged from the groove and allowing the lugs 13 to pass through the openings 7. The pump-tube may now be attached by simply sliding the casing 17 over the collar or sleeve until the lugs 19ª register with the openings 7 and the groove in the casing engages the fingers 10, when the parts may securely lock in the manner before stated.

In Fig. 5 I have illustrated a modified form of the invention in which the collar or sleeve and the valve-casing are formed integral.

In Figs. 9 and 10 I have shown a modified form of cap for the valve and pump-coupling, respectively, the cup-shaped casing in each instance being provided with one or more longitudinal slits forming a series of spring-arms 21, the lower ends of which are provided with an annular groove or recess 22, adapted to engage the spring-arms 10 on the valve when the parts are coupled. If desired, the lower part of the cap 12 and the cup-shaped casing 17 instead of being provided with a groove or channel may be formed with an annular rib 23, as shown in Fig. 11.

From the foregoing description it will be seen that I have provided a cap capable of being quickly applied to or removed from the valve, which effectually prevents the escape of air and being locked both on the inside and outside lessens the liability of said cap becoming loose and dropping off in riding over rough uneven roads, as often happens with caps in use on valves at present.

Having thus described my invention, what I claim, and desire to secure by Letters Patent, is—

1. A device of the class described comprising, a valve-casing, a cap or cover fitting over the valve-casing said valve-casing and cap being provided with interior and exterior interlocking parts.

2. A device of the class described comprising, a valve-casing, a collar secured to the valve-casing, a cap or cover fitting over the collar and means carried by the interior of the collar and interior of the cap, and exterior of the collar and exterior of the cap for locking the parts together.

3. A device of the class described comprising, a valve-casing, a collar secured to the valve-casing, a cap or cover fitting over the collar, said collar and cap being provided with interior and exterior interlocking parts.

4. A device of the class described comprising, a valve-casing, a collar secured to the valve-casing, a cap or cover fitting over the collar, said collar being provided with inwardly-extending locking-flanges adapted to engage correspondingly-arranged locking-lugs secured to the interior of the cap.

5. A device of the class described comprising, a valve-casing, a collar secured to the valve-casing and provided with a series of radial spring-arms, a cap or cover fitting over the collar, a groove or recess in the cap adapted to engage the spring-arms, and interlocking members carried by the interior of the collar and interior of the cap for locking the parts together.

6. A device of the class described, comprising a valve-casing, a collar secured to the valve-casing, a cap or cover fitting over the collar, said collar being provided with inwardly-extending inclined locking-flanges, a depending tube having a hollow extension for the reception of the valve-stem secured to the interior of the cap or cover, said tube being provided with locking-lugs adapted to engage the inclined flanges and auxiliary locking means carried by the exterior of the cap and collar for securing the parts together.

7. A device of the class described comprising, a valve-casing, a cap or cover fitting over the valve-casing, said valve-casing and cap being provided with interlocking parts, inwardly-extending segmental flanges provided with inclined or beveled faces secured to the valve-casing, a hose connection provided with correspondingly-arranged locking-lugs adapted to engage the segmental flanges when the cap or cover is removed and means carried by the exterior of the valve-casing and exterior of the hose connection for locking the two together.

8. A device of the class described comprising, a valve-casing, a collar secured to the valve-casing, a cap or cover fitting over the collar, said collar being provided with an inwardly-extending flange adapted to rest against the end of the valve and a pair of inwardly-projecting segmental plates having inclined under faces and defining oppositely-disposed locking-grooves, a tube having a hollow extension for the reception of the valve-stem and provided with locking-lugs adapted to engage the locking-grooves and auxiliary locking means carried by the exterior of the cap and collar for locking the parts together.

9. A device of the class described comprising, a valve-casing, a collar secured to the valve-casing, a cap or cover fitting over the collar, and provided with inwardly-extending locking-flanges, a depending tube having a hollow extension for the reception of the valve-stem secured to the interior of the cap or cover, said tube being provided with locking-lugs for engagement with the locking-flanges and an annular shoulder adapted to rest on said flanges, and locking means carried by the exterior of the cap and collar for securing the parts together.

10. A device of the class described comprising, a valve-casing, a collar secured to the valve-casing, a cap or cover fitting over the collar, said collar and cap being provided with interlocking parts, inwardly-extending segmental flanges provided with inclined or beveled faces secured to the collar, a hose connection provided with correspondingly-arranged locking-lugs for engagement with the segmental flanges and an annular shoulder adapted to rest on the flanges when the cap is removed, and means carried by the exterior of the collar and exterior of the hose connection for locking the two together.

In testimony that I claim the foregoing as my own I have hereto affixed my signature in the presence of two witnesses.

ALBERT BAXTER CATTERALL.

Witnesses:
W. C. PUTNAM,
W. A. WATTS.